(12) United States Patent
Pinedo

(10) Patent No.: US 10,699,744 B2
(45) Date of Patent: Jun. 30, 2020

(54) 45 RPM TONEOLASCOPE STARSPINNER ADAPTOR

(71) Applicant: Andy Pinedo, Santa Paula, CA (US)

(72) Inventor: Andy Pinedo, Santa Paula, CA (US)

(73) Assignee: Andy Pinedo, Santa Paula, CA (US)

( * ) Notice: Subject to any disclaimer, the term of this patent is extended or adjusted under 35 U.S.C. 154(b) by 0 days.

(21) Appl. No.: 16/571,104

(22) Filed: Sep. 14, 2019

(65) Prior Publication Data

US 2020/0090695 A1 Mar. 19, 2020

Related U.S. Application Data

(60) Provisional application No. 62/731,089, filed on Sep. 14, 2018.

(51) Int. Cl.
*G11B 19/28* (2006.01)

(52) U.S. Cl.
CPC .................. *G11B 19/28* (2013.01)

(58) Field of Classification Search
CPC ........................................ G11B 19/28
USPC ........................................ 369/189
See application file for complete search history.

(56) References Cited

U.S. PATENT DOCUMENTS

| 2,634,133 A | * | 4/1953 | Carbonneau | G11B 19/265 369/267 |
| 3,869,129 A | * | 3/1975 | Tateishi | G11B 19/26 369/239 |

* cited by examiner

*Primary Examiner* — Allen T Cao

(57) ABSTRACT

A 45-record adapter embellished with weighted and shiny chrome ball-bearings and perhaps colored metal balls with LED lights structured and arranged to allow 45 rpm records to be played on a turntable, but also help to hold the records in place while offering record-collectors and enthusiasts a unique, eye-catching novelty.

5 Claims, 2 Drawing Sheets

45 RPM TONEOLASCOPE STARSPINNER ADAPTOR

CROSS-REFERENCE TO RELATED APPLICATION

The present application is related to and claims priority from prior provisional application Ser. No. 62/731,089, filed Sep. 14, 2018 which application is incorporated herein by reference.

BACKGROUND OF THE INVENTION

1. Field of the Invention

The present invention relates generally to the field of phonograph adapter devices and more specifically relates to a 45-record adapter embellished with weighted and shiny chrome ball-bearings and perhaps colored metal balls with LED lights structured and arranged to allow 45 rpm records to be played on a turntable, but also help to hold the records in place while offering record-collectors and enthusiasts a unique, eye-catching novelty.

2. Description of the Related Art

The phonograph is a device, invented in 1877, for the mechanical recording and reproduction of sound. In its later forms, it is also called a gramophone (as a trademark since 1887, as a generic name in the UK since 1910), or, since the 1940s, a record player. The sound vibration waveforms are recorded as corresponding physical deviations of a spiral groove engraved, etched, incised, or impressed into the surface of a rotating cylinder or disc, called a "record". To recreate the sound, the surface is similarly rotated while a playback stylus traces the groove and is therefore vibrated by it, very faintly reproducing the recorded sound. In early acoustic phonographs, the stylus vibrated a diaphragm that produced sound waves which were coupled to the open air through a flaring horn, or directly to the listener's ears through stethoscope-type earphones.

A novelty item is an object that is specifically designed to serve no practical purpose, and is sold for its uniqueness, humor, or simply as something new (hence "novelty", or newness). The term also applies to practical items with fanciful or nonfunctional additions, such as novelty slippers. The term is normally applied to small objects, and is generally not used to describe larger items such as roadside attractions. Items may have an advertising or promotional purpose, or be a souvenir. Therefore, a need exists for a novelty item for users that enjoy playing 45 rpm records that is both useful and provides entertainment.

Various attempts have been made to solve problems found in phonograph adapter devices art. Among these are found in: U.S. Pat. No. 3,029,079 to Elvin F Pierce; U.S. Pat. No. 2,634,133 to Gordon S Carbonneau; and U.S. Pat. No. 4,559,623 to James T. Dennis. This prior art is representative of phonograph record speed adapter devices.

None of the above inventions and patents, taken either singly or in combination, is seen to describe the invention as claimed. Thus, a need exists for a reliable 45 RPM Toneolascope Starspinner Adaptor, 45-record adapter embellished with weighted and shiny chrome ball-bearings and perhaps colored metal balls with LED lights structured and arranged to allow 45 rpm records to be played on a turntable, but also help to hold the records in place while offering record-collectors and enthusiasts a unique, eye-catching novelty and to avoid the above-mentioned problems.

BRIEF SUMMARY OF THE INVENTION

In view of the foregoing disadvantages inherent in the known phonograph adapter devices art, the present invention provides a novel 45 RPM Toneolascope Starspinner Adaptor. The general purpose of the present invention, which will be described subsequently in greater detail, is to provide a 45-record adapter embellished with weighted and shiny chrome ball-bearings and perhaps colored metal balls with LED lights structured and arranged to allow 45 rpm records to be played on a turntable, but also help to hold the records in place while offering record-collectors and enthusiasts a unique, eye-catching novelty. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention, 45 RPM Toneolascope Starspinner Adaptor, constructed and operative according to the teachings of the present invention.

The various embodiments of the present invention will hereinafter be described in conjunction with the appended drawings.

DETAILED DESCRIPTION

As discussed above, embodiments of the present invention relate to a phonograph adapter device and more particularly to a 45 RPM Toneolascope Starspinner Adaptor, a 45-record adapter embellished with weighted and shiny chrome ball-bearings and perhaps colored metal balls with LED lights structured and arranged to allow 45 rpm records to be played on a turntable, but also help to hold the records in place while offering record-collectors and enthusiasts a unique, eye-catching novelty.

Figure 1:
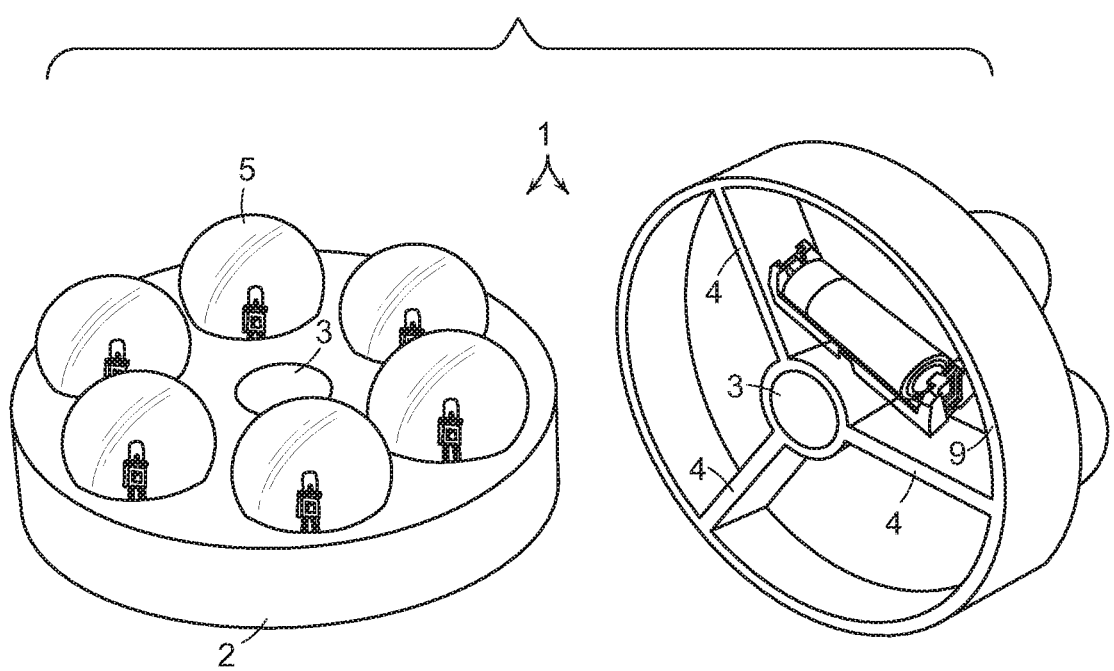
FIG. 1 shows a perspective view illustrating the top side and the bottom side of a 45 RPM Toneolascope Starspinner Adaptor according to an embodiment of the present invention.

Referring now to the drawings FIG. 1, the 45 RPM Toneolascope Starspinner Adaptor comprising a novel product offering consumers a practical solution to the aforementioned challenges. As the name implies, the 45 RPM Toneolascope Starspinner Adaptor comprises a specially designed adapter for a 45-rpm record—an adapter designed to enable 45 records to be played on a turntable or old-fashioned record player, and one embellished to provide not only audible satisfaction, but visual pleasure as well.

The 45 RPM Toneolascope Starspinner Adaptor is a 1½-inch diameter 45 rpm record adapter, fabricated in molded plastic or in metal, which permits a standard 45 rpm record to be played on a standard turntable or an old-fashioned record player. Six chrome-steel or colored plastic ball-bearings are glued to the top.

The six balls occupy the upper surface of the adapter in a concentric ring around the center hole, thereby adding weight to the adapter, helping to keep the 45 rpm record firmly in place on the turntable. The balls bring the total depth or thickness of the 45 RPM Toneolascope Starspinner Adaptor to approximately ⅝-inch.

Further, the balls serve as a visual embellishment as they spin. The steel balls might be faceted and polished to give high reflectance, so that they would scatter light like a disco-ball as they spin. Further, the balls might be formed of translucent, colored plastic, and equipped with compact, battery-powered, micro-LEDs, again offering a distinctive visual element as the 45 rpm record is played.

The 45 RPM Toneolascope Starspinner Adaptor is both a unique novelty item, and a useful one—a 45 rpm record adapter that adds an exciting element of visual enjoyment to the playing of 45s and additional weight to the adaptor to improve performance Record-collectors, audiophiles, and vinyl aficionados—as well as anyone else who enjoys playing original singles from the Big Band or Rock-n-Roll eras—will appreciate the quality of the 45 RPM Toneolascope Starspinner Adaptor as a weighted adapter; and its dual function as a visual embellishment.

Vinyl, as a recording medium, is by no means dead but is instead resurgent in popularity; an on-line record stores offer 45 rpm records in catalogs numbering in the many thousands. The listeners of 45 records are still rocking on, whether on state-of-the-art turntables or on old-fashioned record players: and the 45 RPM Toneolascope Starspinner Adaptor—clever in conception, thoughtful in design, and designed to add visual pleasure to the audio pleasure of listening to vintage 45's—should find a wide and exceptionally enthusiastic market niche among record collectors and audiophiles the world over. The 45 RPM Toneolascope Starspinner Adaptor is cost-effective to produce in the embodiments, as shown in FIG. 1.

Referring now to the drawings, FIG. 1 45 RPM Toneolascope Starspinner 1 has a cylindrical body 2 with a hole 3 in the center for the spindle 6 of the record player. The base of the cylindrical body 2 has three dividers 4 that create three scooped-out sections of the same size around the central hole 3. The top of the cylindrical body 2 has six spherical balls 5 with the lower one third of each ball 5 embedded in the top of the cylindrical body 2. The balls 5 can be made of steel, preferably in a reflective chrome finish or a mirror finish, to create an effect similar to a disco ball when a light is shined on the balls 5 while the starspinner 1 is turning.

Figure 2:
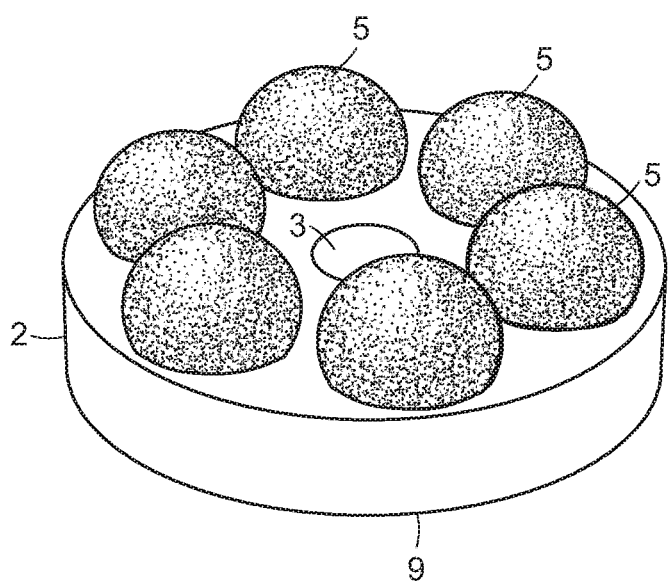
FIG. 2 shows a perspective view illustrating a 45 RPM Toneolascope Starspinner Adaptor according to an embodiment of the present invention.

As shown in FIG. 2, the balls 5 can alternatively be colored plastic, and may be filled with LED lights to create a lighting effect.

Figure 3:
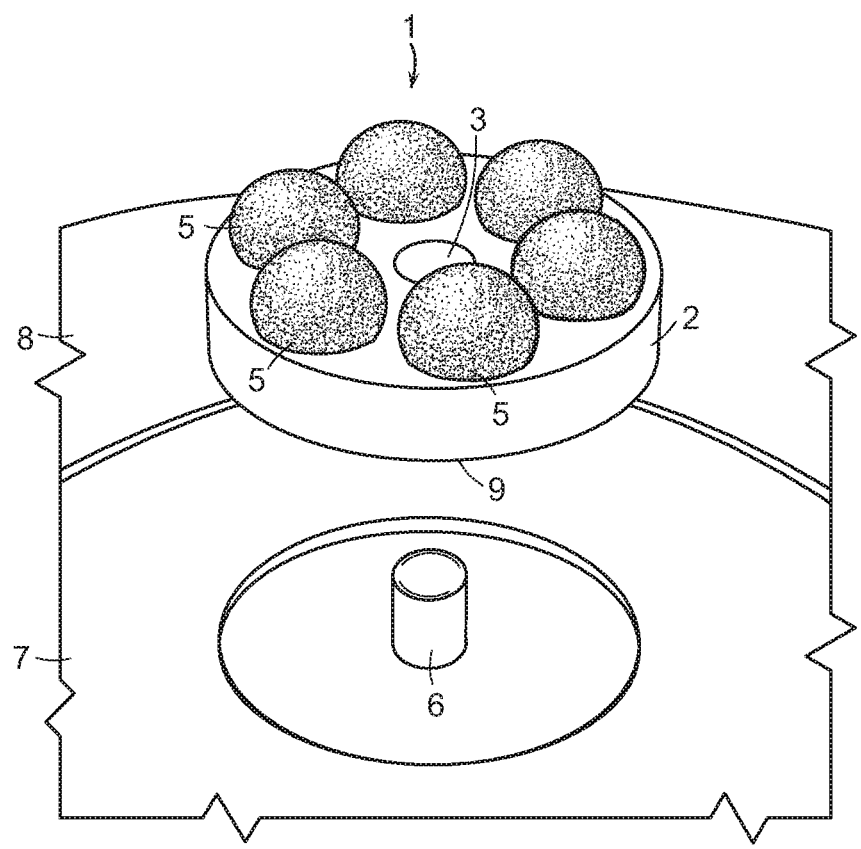
FIG. 3 shows a perspective view illustrating how the 45 RPM Toneolascope Starspinner Adaptor attaches to the turntable spindle.
Figure 4:
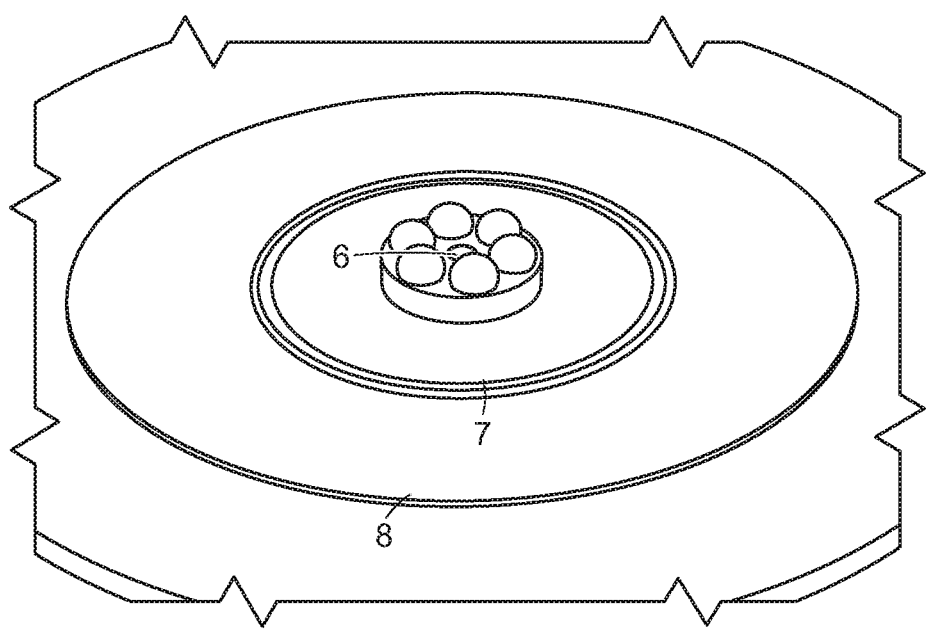
FIG. 4 shows a perspective view illustrating how the 45 RPM Toneolascope Starspinner Adaptor holds a 45 record in place on a regular turntable.

As shown in FIGS. 3 and 4, the starspinner 1 is lowered over the spindle 6 of the turntable so that the outer circumference 9 of the base of the starspinner 1 rests on the inner portion 7 of the 45 record 8. The weight of the starspinner 1 holds the 45 record 8 in place, helping it to turn on the turntable.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claim:

1. A phonograph record speed adapter device comprising:
    (a) a cylindrical body with a top side, a base side, and a lower circumference edge,
    wherein the lower circumference edge is the outer circumference of the base side;
    (b) a central hole that pierces through the cylindrical body from the top side to the base side, wherein the central hole is operably formed to slot over a turntable spindle; and
    (c) six spherical balls, wherein each of the six spherical balls has the same diameter,
    wherein each of the six balls is embedded in the top side of the cylindrical body to form a circle around the central hole, and
    wherein the base side has three dividers that form three evenly sized scooped out portions around the central hole.

2. The phonograph record speed adapter device according to claim 1, wherein the six spherical balls comprise a steel material with a reflective finish.

3. The phonograph record speed adapter device according to claim 1, wherein the six spherical balls comprise a plastic material.

4. The phonograph record speed adapter device according to claim 3, wherein each of the six spherical balls is translucent and contains a LED light, and wherein each LED light is powered by a battery located in one or more of the scooped out portions in the base side of the cylindrical body.

5. The phonograph record speed adapter device according to claim 1, wherein each of the six spherical balls has the same diameter is embedded not more than one third of the diameter deep in the top side of the cylindrical body.

* * * * *